United States Patent [19]

Musacchia

[11] Patent Number: 4,742,637
[45] Date of Patent: May 10, 1988

[54] FISHING ARROWHEAD

[76] Inventor: John Musacchia, P.O. Box 452, Marathon, Fla. 33050

[21] Appl. No.: 17,690

[22] Filed: Feb. 24, 1987

[51] Int. Cl.$^4$ .............................................. A01K 81/00
[52] U.S. Cl. ............................................................ 43/6
[58] Field of Search .................. 43/6, 5; 273/419, 421

[56]  References Cited

U.S. PATENT DOCUMENTS

| | | | |
|---|---|---|---|
| 2,753,643 | 7/1956 | Recker | 43/6 |
| 2,904,338 | 9/1959 | Podufal | 43/6 |
| 2,937,873 | 5/1960 | Grissinger | 43/6 |
| 2,939,708 | 6/1960 | Scheib | 43/6 |
| 3,014,305 | 12/1961 | Yurchich | 43/6 |
| 3,164,385 | 1/1965 | Shure | 273/419 |
| 3,945,642 | 3/1976 | Henthorn | 43/6 |

Primary Examiner—Gene P. Crosby
Attorney, Agent, or Firm—Richard C. Litman

[57] ABSTRACT

A fishing arrowhead is disclosed for application to a bow and arrow, spear, gig or other fishing implement. The head has a U-shaped retaining barb which can be pivoted from a shooting position in which the barbs lie substantially in a plane passing through the longitudinal center line of the fishing implement and extending rearwardly from the tip of the implement to a fish holding position in which the barbs extend substantially at right angles to the longitudinal axis of the implement. The bight portion of the U-shaped retaining barb is rotatably secured in a bore which extends transversely through a cylindrical adapter which is secured to the fishing implement. The retaining barb is locked against pivotable motion beyond the desired holding position by the tip of the implement which is threaded onto the adapter. The retaining barb may be rotated from its fish holding position to a fish releasing position in which the barbs extend toward the tip of the implement and substantially along the longitudinal center line thereof by partially unthreading the tip from the implement. Complete disassembly is not required. A modification of the fishing head is also disclosed.

11 Claims, 1 Drawing Sheet

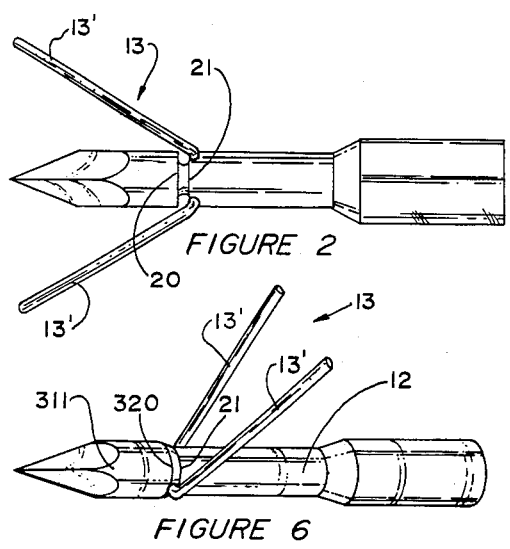
FIGURE 2
FIGURE 6
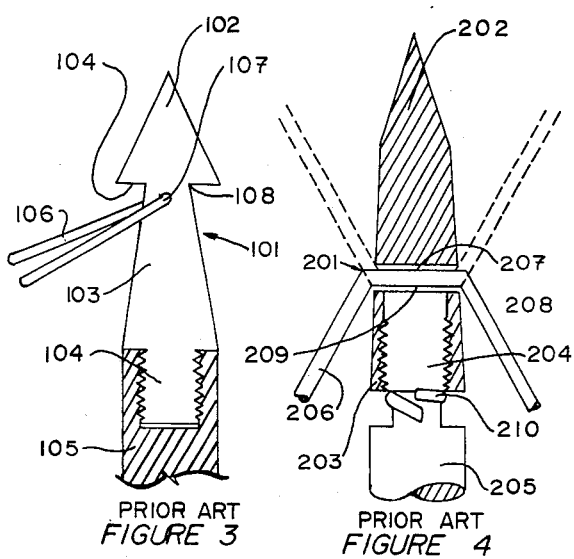
PRIOR ART
FIGURE 3
PRIOR ART
FIGURE 4
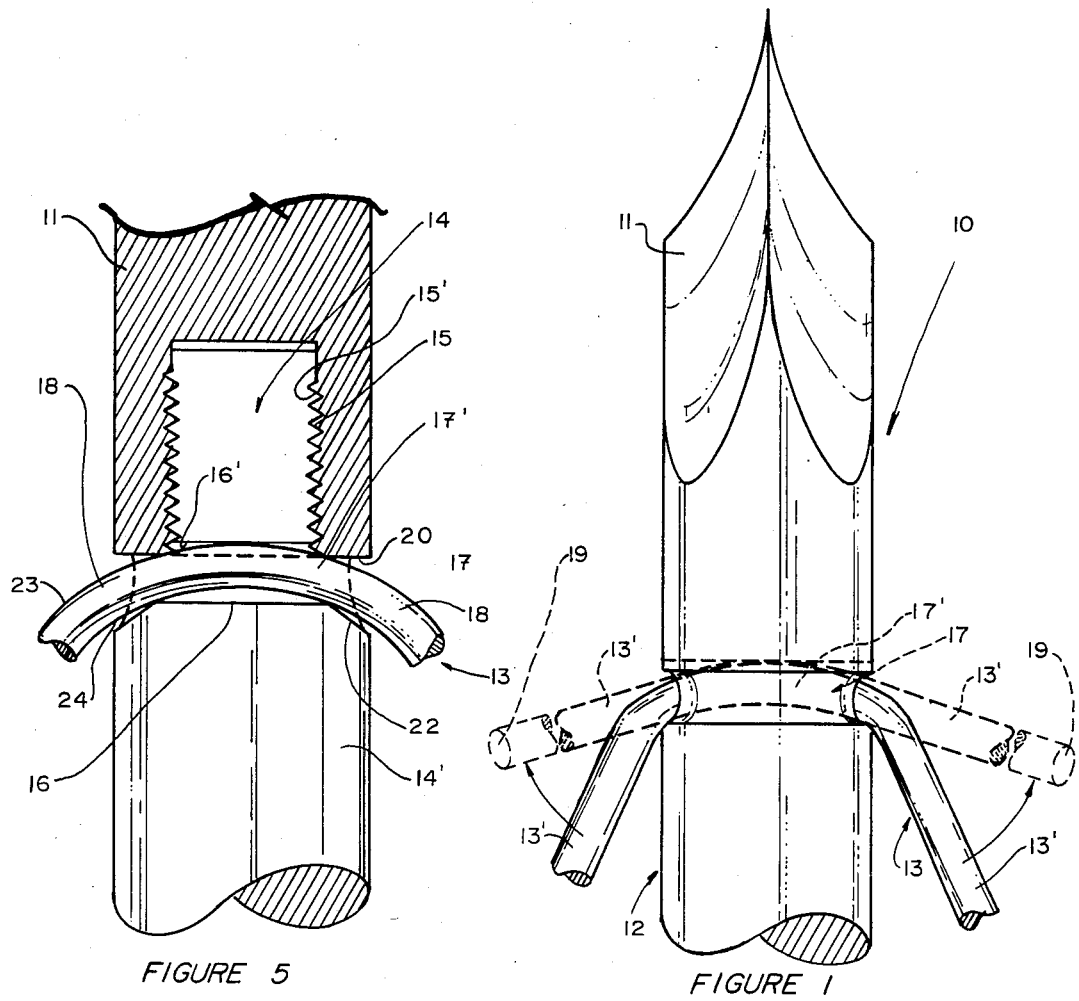
FIGURE 5
FIGURE 1

FISHING ARROWHEAD

BACKGROUND OF THE INVENTION

This invention relates to a fishing head for use with a bow and arrow, spear or gig, and particularly to such a fishing head which is provided with a retaining barb or locking device which can selectively be placed in a position to prevent the escape of a fish which has been shot or speared.

Arrowheads designed to hold a fish which has been shot with a bow and arrow by means of a pivotable barb have previously been known. FIGS. 3 and 4 illustrate two of the prior art devices.

In FIG. 3 an arrowhead 101 is provided with a pointed piercing tip 102 and a depending skirt portion 103 which flares outwardly away from the tip. The arrowhead is provided with an externally threaded mandrel 104 for attachment to the shaft 105 of an arrow. A through bore 107 is provided at the narrow point 108 of the skirt portion 103 adjacent the widest portion 109 of the piercing tip. A retaining barb 106 of generally U-shaped configuration has its bight portion inserted through the bore 107 and can rotate from a position in which the legs of the retaining barb extend substantially along the longitudinal axis of the arrow to a position as shown in FIG. 3 where the retaining barbs are held by the wide portion 109 of the piercing tip in a position substantially transverse to the longitudinal axis of the arrow. It is not possible to release the fish holding barbs to a fish releasing position in which the open end of the U point toward the tip of the arrowhead. To remove a fish the arrowhead must be completely unscrewed from the shaft of the arrow so that the fish can be slid over the threaded mandrel. This can be a difficult task in adverse weather conditions which can prevail when such fishing is being done.

FIG. 4 shows another form of fish holding arrowhead 201. Arrowhead 201 has a sharp piercing tip 202 which has an internally threaded depending skirt portion 203 which receives a threaded mandrel 204 of an adapter 205 which is designed to attach to the shaft of an arrow. The bight portion of a generally U-shaped fish retaining barb 206 is retained in bore 207 in the tip of the arrowhead. The retaining bard 206 is of generally circular cross-section but is provided with a flat face 208 which cooperates with the flattened end 209 of the threaded mandrel 204 when the parts are completely threadedly mated to prevent rotation of the retaining barb 206 from its shooting or fish penetrating position in which it is shown in solid lines in FIG. 4. When the adapter 205 is unthreaded from piercing tip 202 by about a half turn, the retaining barbs may be swung to the position indicated by the dotted lines FIG. 4, in which a fish may be withdrawn over the tip of the arrowhead and the retaining barbs. When the adapter is unthreaded from the fully threaded position to positions less than about a half turn, the retaining barb is allowed to rotate from its fish penetrating position by varying amounts up to about a 90 degree angle with respect to the longitudinal axis of the arrowhead and shaft. In this position the retaining barb will prevent withdrawal of a fish over the tip of the arrow. The locking ring 210 is apparently intended to help maintain the various positions of adjustment between the threaded parts. As may be seen, adjustment of the retaining barbs is extremely critical and a very small rotation between the threaded parts caused by spinning of the fish while it is being retrieved, as is very likely to happen, will cause complete reversal of the retaining barbs to the fish releasing position and the loss of the fish. In addition, in both of the examples of prior art shown in FIGS. 3 and 4, because of the location of the retaining barbs in the tip of the arrow rather than on the shaft of the arrow, rotation of the fish during retrieval may very well completely remove the arrowhead from the arrow shaft, losing both the fish and the arrowhead.

In the present invention the retaining barb is secured to the mandrel which in turn is secured to the shaft of the arrow rather than to the tip of the arrowhead so that spinning of the fish while it is being reeled in will not disassemble the fishing head and release the fish. With the mandrel fully threaded to the tip of the arrowhead the retaining barbs are allowed to swing freely to a fish holding position approximately at right angles to the center line of the arrow. When it is desired to release the fish and remove it from the arrowhead it is necessary only to unthread the tip of the arrow approximately two or three turns which allows the retaining barbs to swing a full 180 degrees from the original shooting position so that the arrow can be easily removed from the fish.

SUMMARY OF THE INVENTION

This invention provides a fishing head for a bow and arrow, spear or gig which has locking means which automatically move to a position to hold the fish on the fishing implement after a fish has been shot or speared. The fishing head and retaining barb are constructed and arranged to operate in such a manner that a fish cannot be accidentally or inadvertently dislodged but can be readily released when it is desired to do so by a simple manipulation which does not require disassembling of the arrowhead from the arrow.

Although it is obvious that the invention can be applied readily to arrows, spears, gigs or other fishing implements it will be described and illustrated herein as applied to an arrow.

The retaining or locking barb comprises a generally U-shaped member which has its bight portion inserted and retained in an opening or bore through the adapter or ferrule of the arrow. The tip of the arrowhead is threaded onto the ferrule to secure the retaining barb to the arrow. When a fish is shot with an arrow and the arrow reeled in to recover the fish, movement of the fish toward the tip of the arrow will cause the retaining barbs to rotate to a position in which the included angle between the barbs and the longitudinal axis of the arrow is approximately 90 degrees or less thereby preventing release of the fish over the tip of the arrow. The location and configuration of the bore through the mandrel, the shape of the bight portion of the retaining barbs and the position of the inward end of the tip of the arrowhead when it is threaded onto the mandrel cooperate to prevent the retaining barbs from rotating outwardly more than 90 degrees from the longitudinal axis of the arrow. If the tip of the arrowhead is loosened by unthreading it approximately two or three turns the retaining barbs will be allowed to rotate freely so that the open end of the U will be pointing toward the tip of the arrow. In this position of the barbs the arrow can readily be withdrawn from the fish.

It is an object of this invention to provide a fishing arrowhead with retaining means which will prevent loss of fish which has been shot with an arrow.

It is another object of this invention to provide such an arrowhead in which the retaining barbs can selectively be released to permit easy withdrawal of the fish from the arrow.

It is another object of this invention to provide such an arrowhead in which the retaining barbs can be locked at a preselected controllable angle with respect to the longitudinal axis of the arrow.

Still another object of the invention is to provide a fishing arrowhead of the type described in which the fish can be removed when desired without separation of any parts of the arrow.

Another object of the invention is to provide a fishing head of the type described which may be applied to an arrow, a spear, a gig or other forms of fishing apparatus.

These and other objects, features and advantages of this invention will become apparent from the following description in conjunction with the accompanying drawings.

BRIEF DESCRIPTION OF THE DRAWINGS

FIG. 1 illustrates an arrowhead constructed in accordance with the present invention with the retaining barbs shown in the starting or shooting position and with the fish holding position of the retaining barbs shown in dotted lines.

FIG. 2 is a view similar to FIG. 1 but wherein the tip of the arrowhead is shown partially unscrewed to allow the retaining barbs to move into the fish releasing position, which is illustrated.

FIGS. 3 and 4 illustrate prior art.

FIG. 5 is an enlarged cross-sectional view of the embodiment shown in FIG. 1.

FIG. 6 is a view similar to FIG. 1 but showing a modified form of the invention in which the tip of the arrow is made with a larger diameter so that is will more positively limit rotation of the retaining barbs.

Turning now to FIGS. 1 and 5 the invention comprises a hunting head such as an arrowhead 10, comprising a rearward ferrule or adapter 12 which can be attached to the shaft of an arrow (not shown) and includes a forwardmost tip 11 which can be removably attached to the ferrule. As seen in FIG. 5, the forward end 14 of the ferrule 12 is of reduced diameter as at 15' to allow ajustable and removable attachment of externally threaded and the arrow tip 11 which is provided with mating internal threads 15. The ferrule also has a bore 16 extending therethrough in a direction transverse to the longitudinal axis of the arrowhead and which will be seen to be disposed at the rear of the forward portion or end 14 immediately adjacent a rear portion or end 14' of the ferrule 14.

A generally U-shaped retaining barb 13 is mounted for pivoting movement about its bight portion 17 within the bore 16. The middle part 17' of the bight portion of the retaining barb is substantially rectilinear or has a relatively large radius of curvature as can be seen in FIG. 5 for example, and the radius of curvature decreases steadily along the bight portion 17 of the retaining barb to approximately the points indicated by the numeral 18 in FIG. 5. The curvature of the middle 17' of the bight portion of the retaining barb is not necessary but occurs a fortiori when the wire is bent to form the barbs after it has been inserted in the bore 16. The legs 13'—13' of the retaining barb diverge outwardly away from each other from the bight portion 17 toward their outer ends 19 to provide contact over a broader area of a fish which they engage. The retaining barb may be made of any suitable material but a spring steel is found to be desirable. The retaining barb is illustrated as having a circular cross section but any geometrical shape including a polygonal cross-section may be utilized.

The tip 11 is shown as a trocar tip but any other suitable fish piercing tip 11 may readily be used. Although a separate ferrule or adapter 12 is shown it could be made as an integral part of the shaft of the arrow.

As seen in FIGS. 2 and 5, the threaded forward end 14 of the ferrule 12 is of reduced diameter relative to the adjacent unthreaded rear portion 14' and forms an annular forwardly facing surface or shoulder 21. The bore hole 16 is drilled at the very end of the unthreaded portion so that the forward portion 16' of the bore hole actually extends slightly into the reduced threaded portion 14. When the tip 11 of the head is threaded onto the threaded portion 14 of the ferrule, the rearwardly facing annular bottom face or edge 20 of the tip is juxtaposed the shoulder 21 on the rear end of the ferrule and the annular surface 20 of the tip, when rearwardly seated as in FIG. 5, will slightly overlap the portion of the bore 16 which extends through the reduced threaded portion 14 of the ferrule. Each end of the bore hole 16 is countersunk, to form a relieved portion in the ferrule as indicated by the numeral 22. This provides clearance which permits unobstructed rotation of the bight portion 17 of the fish retaining barb 13, within the limitations as explained below.

The center line of the bore 16 will be apparent in FIG. 5. The axis of rotation of the bight portion 17 of the barb 13 within the bore 16 substantially coincides with the center line of the bore 16. It can be visualized that as the barb legs 13'—13' are rotated out of alignment with the longitudinal axis or center line of the arrowhead toward a position in which the barb legs lie transverse to or angularly offset from said longitudinal center line, the outer or convex edge 23 of the sharply curved portions 18 of the barb will move away from contact with the rearwardly facing annular surface 20 of tip 11. At the same time the relieved surfaces 22 of the bore hole 16 will allow rotation of the inner concave edge 24 of said sharply curved barb portion without interference. However, it can be seen that as rotation continues in the same direction, the barb inner edge 24 moves toward contact with the annular surface 20 of the tip 11 until a camming or wedging action occurs and finally the retaining barb is completely locked against further rotation. Stated more simply, by virtue of the location of the bore 16 and the countersinking of its ends, with the tip 11 removed or backed off from the seated position of FIG. 5, the barb could be rotated freely about its bight portion over 360 degrees. However, when the tip is assembled on the ferrule or adapter, the annular surface 20 overlies the rotational path of the portions 18 of the barb, thereby limiting its rotation to the desired angle. Optimally this locking action should occur when the barb legs 13' are rotated between 75 degrees and 90 degrees away from the longitudinal center line of the arrow or equivalent device. It should be noted that when the parts are in such angular the barb is locked in its fish holding position and the tip 11 is also locked against unthreading. This further insures against accidental release of the retaining barbs from its fish holding position since this can occur only by unthreading the tip 11 as will be described hereinafter.

The dotted lines 19 in FIG. 1 indicate the position of the retaining barb in its forward locked position in which position the barb prevents escape of fish which have been shot with the arrowhead. To permit the retaining barb legs 13' to rotate to the fish releasing position shown in FIG. 2, it is only necessary to retract the piercing tip 11 by about two or three turns of the threads 15 after moving the barbs slightly back toward their shooting position to permit the tip to be unthreaded. This will avoid the wedging action described above and will allow the retaining barb to rotate freely without interference from the annular surface 20 of the arrow tip. When the surface 20 is displaced forwardly, not only is clearance provided to allow the inner edges 24 of the limb sections 18 to move forward but also, the effective diameter of the bore 16 is increased such that the center of the outer edge 23 will not cam against the rear of the bore. However, it is not possible for the arrow tip to be accidentally dislodged during recovery of the fish merely by spinning action of the fish.

As previously explained, the extent of permitted rotation of the barb between the shooting or fish penetrating position and its fully locked position, indicated by the dotted lines in FIG. 1, is determined by the diameter of the wire, the diameter of the bore 16, location of the center line of the bore 16 with respect to shoulder 21, the radius of curvature of the bight portion of the retaining barb and the radius at which the retaining barb is bent at the point where it emerges from the bore 16. In addition, the ability of the retaining barb to rotate freely between its shooting position and its locking position is determined in part by the angle and depth of the counter bores 22. An example of a combination of angles and dimensions from which the invention has been successfully constructed are as follows:

| | |
|---|---|
| Cross sectional diameter of retaining barb | 0.092 inches |
| Diameter of bore | 0.100 inches |
| Distance from shoulder 21 to center of bore 16 | 0.030 inches |
| Angle of counterbore 22 | 30 degrees |
| Depth of counterbore 22 | 0.050 inches |
| Radius of curve at point 18 | 0.125 inches |
| Permitted angle of rotation | Approx. 75 degrees |

The above dimensions, angles and radii are given as examples of a combination thereof which will cooperate to produce a workable device in accordance with the invention and are neither intended nor to be construed in any way as a limitation of the scope of the invention.

FIG. 6 shows a variation of the invention in which the arrow tip 311 is constructed with a base which has a diameter greater than the diameter of the adjacent shoulder 21 of the ferrule 12. This provides greater abutment between the retaining barb 13 and the shoulder 320 on the tip 311 and a more positive lock against rotation of the retaining barb beyond the angle at which it has been designed to stop. The remaining construction of the arrowhead is otherwise as previously described.

In any embodiment, the fishing head barb operates in a similar manner. In the ready or shooting position, the components are as depicted in FIG. 5 and the forward motion of the device, as it is thrown or otherwise projected, as well as its passage into the target game, will maintain the bard legs rearwardly or substantially in the plane of the device's longitudinal axis. Whether the tip 11 and barb 13 pass entirely through the game or remain embedded therein, it will be understood that any struggle or attempt to retract the head from the game will automatically insure displacement of the barb legs to the angularly offset position as shown in FIG. 6 or the broken line position of FIG. 1. To obtain a release of the barb legs from the retention position and enable retraction of the entire device from the game, the tip 11 is first pushed forwardly until the barb is fully exposed. Then, one unscrews the tip 11 approximately two-three turns so as to move its annular rear surface 20 forwardly, at least to the forward edge of the bore 16. Thereafter, the barb bight 17 is free to rotate without interference and the legs are automatically displaced to the position of FIG. 2 as the device is rearwardly withdrawn through the game.

It can be seen that this invention has provided an effective and improved fish retaining arrowhead. It is to be understood that the invention disclosed herein is not limited to the details of construction and arrangement of parts illustrated in the accompanying drawings but is capable of being practiced or carried out in various ways. Furthermore, the terminology and examples employed herein are for the purpose of description only and are not to be considered as limitations.

It is obvious to those skilled in the art that although the invention has been shown and described in a limited number of preferred embodiments, many variations may be made in the form and structure here presented without departing from the scope of the invention as set forth in the appended claims.

What is claimed is:

1. A game retaining head for a projectable hunting implement comprising:
   an adapter for attaching said head to a hunting implement, said adapter having a forward portion and a rear portion,
   a piercing tip provided with attachment means for removably securing said tip to said adapter forward portion,
   said adapter provided with a transverse bore disposed substantially intermediate said forward and rear portions,
   a barb having a middle bight portion disposed within said adapter bore and a pair of distal legs diverging from said bight portion,
   said barb freely rotatable from a game piercing position in which said barb legs lie in a plane substantially in alignment with the longitudinal center line of said adapter to a game retaining position in which said bight portion is rotated and said barb legs are displaced to an angle from the plane of the longitudinal center line, and
   displaceable barb engaging means on said tip normally engageable with said barb following its displacement from said game piercing position to said game retaining position to limit further displacement of said barb and to define the limit of said game retaining position.

2. A retaining head as set forth in claim 1 in which said barb is of generally U-shaped configuration with said legs of the U flaring outwardly with respect to each other as they extend from said bight portion.

3. A retaining head as set forth in claim 2 wherein said bight portion is of substantially rectilinear configuration.

4. A retaining head according to claim 1 wherein,
   said attachment means on said tip includes threads engaging with threads on said adapter forward portion.

5. A retaining head according to claim 1 wherein,
   the cross section of said barb is substantially circular.

6. A retaining head according to claim 1 wherein, said displaceable barb engaging means on said tip includes a rearwardly facing annular surface, whereby rotation of said barb away from said game piercing position is limited by engagement of portions of said barb adjacent said bight portion with said annular surface.

7. A retaining head according to claim 1 wherein, the diameter of said piercing tip adjacent said adapter forward portion is greater than the diameter of said adapter forward portion adjacent said tip.

8. A retaining head according to claim 1 wherein, the diameter of said piercing tip adjacent said adapter forward portion is substantially equal to the diameter of said adapter forward portion adjacent said tip.

9. A retaining head according to claim 6 wherein, said tip attachment means includes threads allowing axial displacement of said tip and annular surface relative said adapter, and said bore provided with opposite ends, whereby when said annular surface is rearwardly displaced and partially masks said bore ends, said barb is restricted to displacement between said game piercing and retaining positions but when said annular surface is forwardly displaced to fully expose said bore ends, said barb is free to rotate to a position with said legs disposed in a forward manner to allow rearward withdrawal of said head from game flesh.

10. A retaining head according to claim 6 wherein, said barb bight portion comprises an arcuate member extending through and beyond said bore ends.

11. A retaining head according to claim 6 wherein, said barb legs when in said retaining position define an obtuse angle relative the longitudinal center line.

* * * * *